(12) United States Patent
Eklund et al.

(10) Patent No.: US 7,949,229 B2
(45) Date of Patent: May 24, 2011

(54) DISCONTINUOUS TIMELINE IN DISC AUTHORING

(75) Inventors: Don Eklund, Yorba Linda, CA (US); Sumit Malik, Pasadena, CA (US); Raja Sahi, Los Angeles, CA (US); Tommy Choy, Lakewood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1273 days.

(21) Appl. No.: 11/467,878

(22) Filed: Aug. 28, 2006

(65) Prior Publication Data

US 2007/0047922 A1 Mar. 1, 2007

Related U.S. Application Data

(60) Provisional application No. 60/712,664, filed on Aug. 29, 2005, provisional application No. 60/712,684, filed on Aug. 29, 2005.

(51) Int. Cl.
*G11B 27/00* (2006.01)
(52) U.S. Cl. ........................................ 386/278
(58) Field of Classification Search .................. 386/52
See application file for complete search history.

(56) References Cited

U.S. PATENT DOCUMENTS

| | | | |
|---|---|---|---|
| 3,088,996 A | 5/1963 | Carter | |
| 6,404,711 B1 | 6/2002 | Kato | |
| 6,453,459 B1 | 9/2002 | Brodersen et al. | |
| 6,771,881 B1 | 8/2004 | Ketcham | |
| 6,807,363 B1 | 10/2004 | Abiko et al. | |
| 2002/0035732 A1 | 3/2002 | Zetts | |
| 2002/0112226 A1 | 8/2002 | Brodersen et al. | |

(Continued)

FOREIGN PATENT DOCUMENTS

EP 1503587 2/2005

(Continued)

OTHER PUBLICATIONS

International Search Report and Written Opinion issued in PCT/US06/34307 on Oct. 18, 2007.

(Continued)

*Primary Examiner* — Peter-Anthony Pappas
*Assistant Examiner* — Daniel Tekle
(74) *Attorney, Agent, or Firm* — Samuel S. Lee; Procopio, Cory, Hargreaves & Savitch LLP (57) ABSTRACT

Synchronizing media data used in authoring a Blu-ray disc (BD) comprising: receiving a discontinuous input timecode associated with at least one stream of the media data, said discontinuous input timecode having at least one discontinuity, said at least one discontinuity having a start point and an end point; generating an output timecode that matches said discontinuous input timecode until the start point of said at least one discontinuity, and continue generating said output timecode sequentially from a timecode subsequent to the end point of said at least one discontinuity, if a user specifies a continuous output timecode; and generating an output timecode that matches said discontinuous input timecode until the start point of said at least one discontinuity, and continue generating said output timecode that matches input timecode from a timecode subsequent to the end point of said at least one discontinuity, if a user specifies a discontinuous output timecode.

18 Claims, 11 Drawing Sheets

U.S. PATENT DOCUMENTS

| | | |
|---|---|---|
| 2002/0174438 A1 | 11/2002 | Cleary et al. |
| 2003/0193520 A1 | 10/2003 | Detzel |
| 2004/0167916 A1 | 8/2004 | Basso et al. |
| 2004/0210896 A1 | 10/2004 | Chou et al. |
| 2004/0220791 A1 | 11/2004 | Lamkin et al. |
| 2004/0240360 A1 | 12/2004 | Kim et al. |
| 2005/0013593 A1 | 1/2005 | Jung et al. |
| 2005/0052572 A1* | 3/2005 | Sakaniwa et al. ............. 348/441 |
| 2005/0114909 A1 | 5/2005 | Mercier |
| 2005/0155058 A1 | 7/2005 | Jung et al. |
| 2005/0185929 A1 | 8/2005 | Kang et al. |
| 2006/0165388 A1 | 7/2006 | Uesaka et al. |

FOREIGN PATENT DOCUMENTS

| | | |
|---|---|---|
| JP | 2003228961 | 8/2003 |

OTHER PUBLICATIONS

International Search Report and Written Opinion issued in PCT/US2006/34306 on Aug. 29, 2007.

Extended European Search Report issued in European application No. 06790146.2 Nov. 19, 2009.

International Search Report/Written Opinion issued in PCT/US06/26058 on Jun. 27, 2008.

International Search Report/ Written Opinion issued in PCT/US06/64191 on Jul. 14, 2008.

International Search Report/ Written Opinion issued in PCT/US06/34190 on Jul. 8, 2008.

International Search Report and Written Opinion issued in PCT/US2006/34316 on Aug. 2, 2007.

International Search Report and Written Opinion issued in PCT/US2006/33915 on April 12, 2007.

* cited by examiner

DISCONTINUOUS TIMELINE IN DISC AUTHORING

RELATED APPLICATION

This application claims the benefit of priority of U.S. Provisional Patent Application Ser. No. 60/712,664, entitled "Disc Authoring" and U.S. Provisional Patent Application Ser. No. 60/712,684, entitled "Abstractions in Disc Authoring", both filed Aug. 29, 2005. This application is also related to U.S. patent application Ser. No. 11/467,896, entitled "Abstractions in Disc Authoring", filed on the same day as this application. The disclosures of the above-referenced patent applications are hereby incorporated by reference.

BACKGROUND

The present invention relates generally to disc authoring and, more particularly, to generating synchronizing timecode in authoring optical discs such as Blu-ray Discs.

A media authoring system is typically used to generate articles of media that are compliant with a particular standard. For example, a Digital Versatile Disc (DVD) authoring system is used to generate data, such as audio and video data and information used to present and access the audio and video data, on a DVD. The data on the disc is stored according to standards defined for DVD. Similarly, a Blu-ray Disc (BD) authoring system is used to create optical discs storing information according to the standards defined for BD.

SUMMARY

Implementations of the present invention include systems and methods to implement techniques for generating synchronizing timecode for the BDAS.

In one implementation, a method of synchronizing media data used in authoring a Blu-ray disc (BD) comprises: receiving a discontinuous input timecode associated with at least one stream of the media data, the discontinuous input timecode having at least one discontinuity, the at least one discontinuity having a start point and an end point; first generating an output timecode that matches the discontinuous input timecode until the start point of the at least one discontinuity, and continue first generating the output timecode sequentially from a timecode subsequent to the end point of the at least one discontinuity, if a user specifies a continuous output timecode; and second generating an output timecode that matches the discontinuous input timecode until the start point of the at least one discontinuity, and continue second generating the output timecode that matches input timecode from a timecode subsequent to the end point of the at least one discontinuity, if a user specifies a discontinuous output timecode.

In another implementation, a system of synchronizing media data used in authoring a Blu-ray disc (BD) comprises: a receiver configured to receive a discontinuous input timecode associated with at least one stream of the media data, the discontinuous input timecode having at least one discontinuity, the at least one discontinuity having a start point and an end point; and a discontinuous timeline processor configured to: (1) generate an output timecode that matches the discontinuous input timecode until the start point of the at least one discontinuity, and continue to generate the output timecode sequentially from a timecode subsequent to the end point of the at least one discontinuity, if a user specifies a continuous output timecode; and (2) generate an output timecode that matches the discontinuous input timecode until the start point of the at least one discontinuity, and continue second generating the output timecode that matches input timecode from a timecode subsequent to the end point of the at least one discontinuity, if a user specifies a discontinuous output timecode.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by studying the accompanying drawings, in which like reference numerals refer to like parts, and in which.

DETAILED DESCRIPTION

As will be further described below, implementations of the present invention provide the need for an efficient structure and configuration in authoring articles of media that are compliant with the Blu-ray Disc (BD) standard specifications. A BD authoring system (BDAS) executes instructions to store information based on the BD standard specifications. In one implementation, a synchronizing timecode is generated for the BDAS.

After reading this description it will become apparent to one skilled in the art how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention as set forth in the appended claims.

The BD standard specifications include the BD Read Only Memory (BD-ROM) specification, which provides a number of data structures that needs to be defined on a BD in order for the disc to behave as desired. The BD-ROM specification defines BD Prerecorded and BD Recordable application formats.

Figure 1:
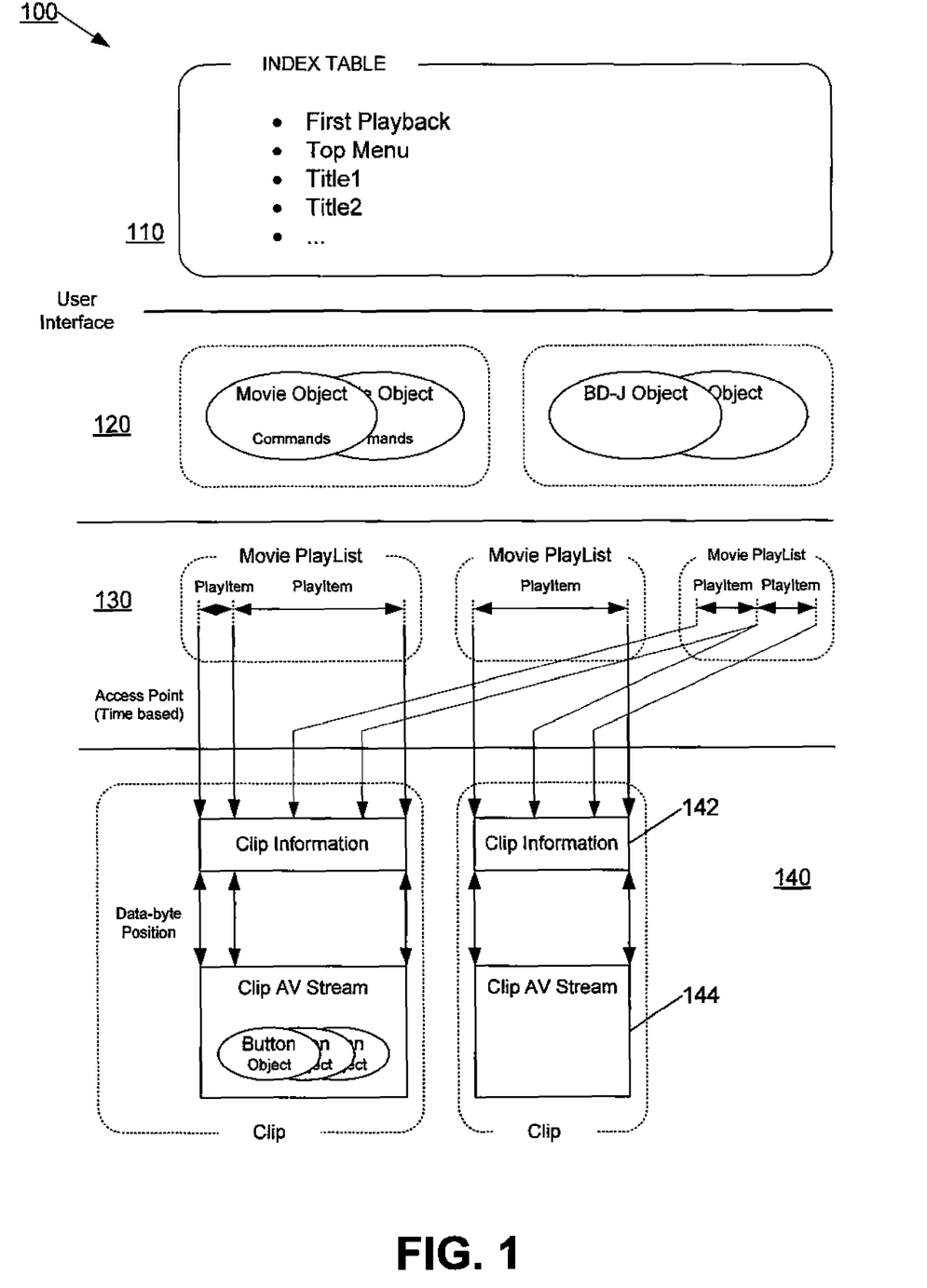
FIG. 1 provides a simplified overview of the BD-ROM data structure.

FIG. 1 shows an overview of the BD-ROM data structure 100. BD-ROM has four layers for managing Audio/Video (AV) stream files as follows: Index Table 110, Movie Object/BD-J Object 120, Playlist 130, and Clip 140.

Figure 2:
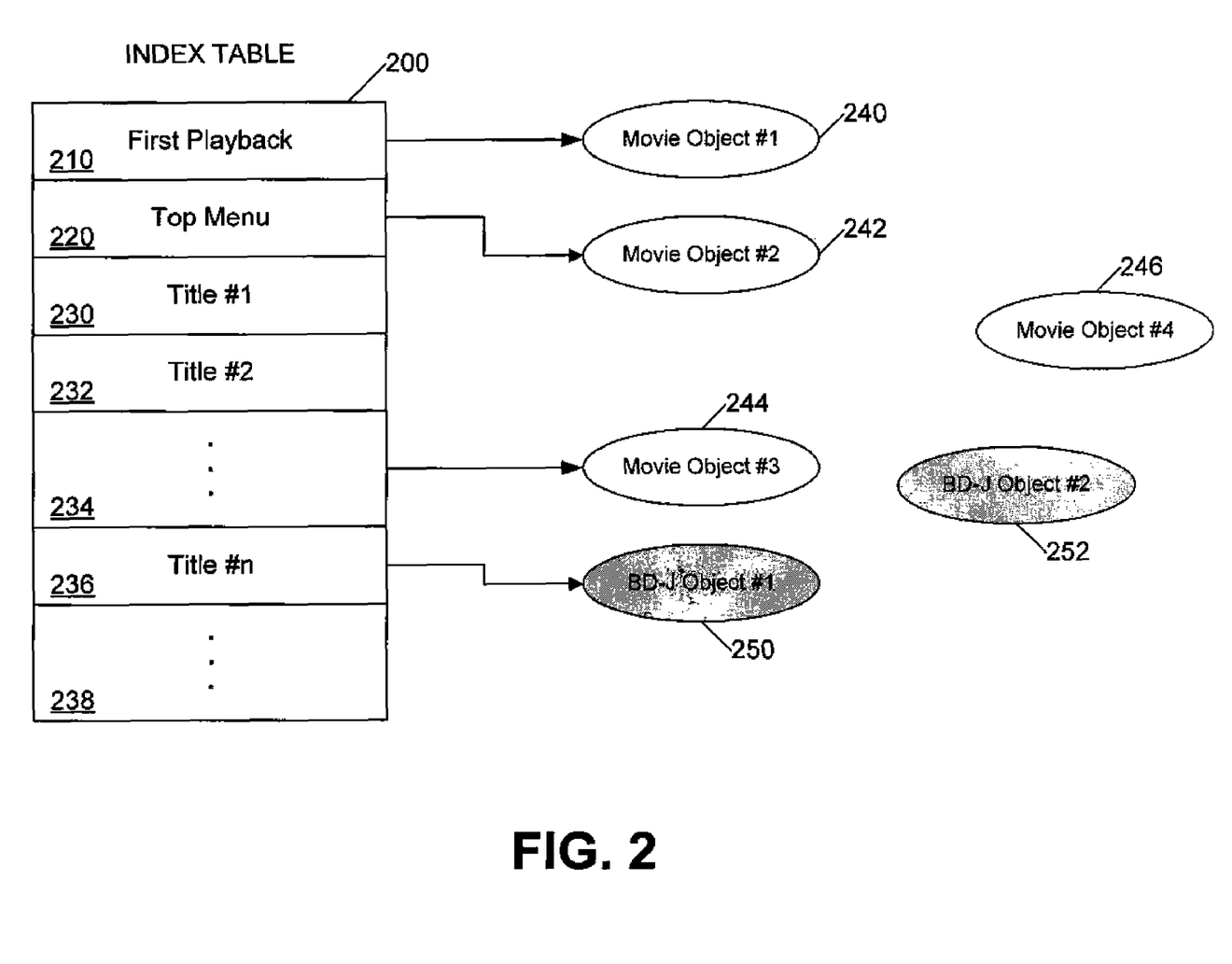
FIG. 2 shows Index Table, which is a top-level table structure that defines the Titles of a BD-ROM disc.

Index Table 200, shown in FIG. 2, is a top-level table structure that defines the Titles of a BD-ROM. A Title corresponds to any entry in the Index Table including First Playback 210, Top Menu 220, and Titles 230, 232, 234, 236, 238. First Playback 210 is used by content providers to perform automatic playback. Each Index Table entry links to either a Movie Object 240, 242, 244, 246 or BD-J Object 250, 252. The disc player references this table whenever a title is to be executed (e.g. whenever the Title Search or Menu Call operation is called).

Figure 3:
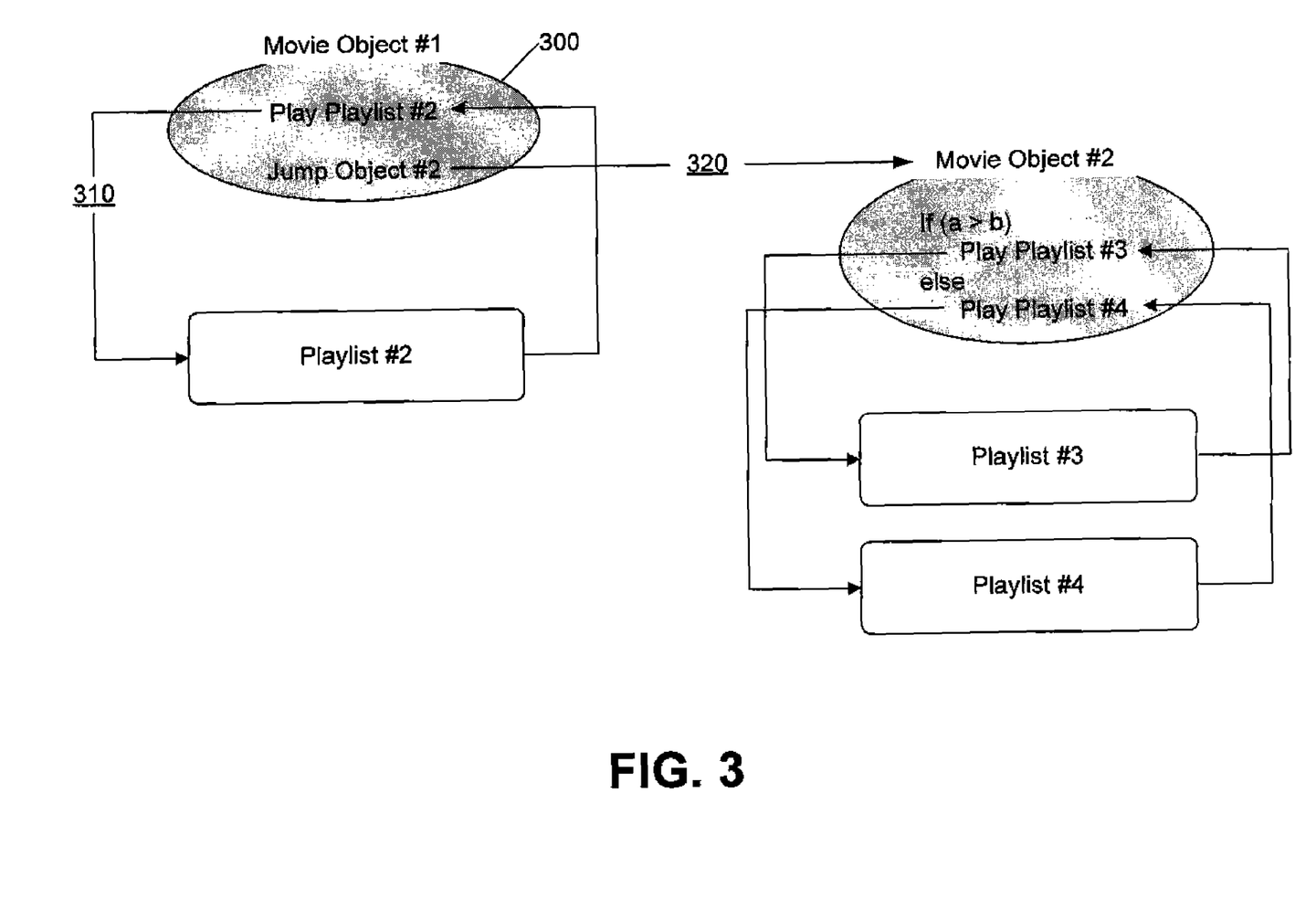
FIG. 3 shows one example of a Movie Object including navigation commands that can launch Playlist or another Movie Object.

A Movie Object includes executable lines of codes or navigation commands, which enable dynamic scenario description. Thus, as shown in FIG. 3, navigation commands in a Movie Object (e.g., 300) can launch Playlist playback 310 or another Movie Object 320. This enables the content providers to define a set of Movie Objects for managing playback of Playlists in accordance with a user's interaction and preferences.

When a Title associated with a BD-J Object in the Index Table on disc is selected, the corresponding application is automatically launched and its lifecycle is bound to the Title. A BD-J application is a Java Xlet which is controlled by the BD-ROM player's Application Manager through its Xlet interface. The Xlet interface has four states as follows: loaded, paused, active and destroyed. Once a BD-J application is destroyed, any resources allocated to it, such as memory and AV control, is released.

Figure 4:
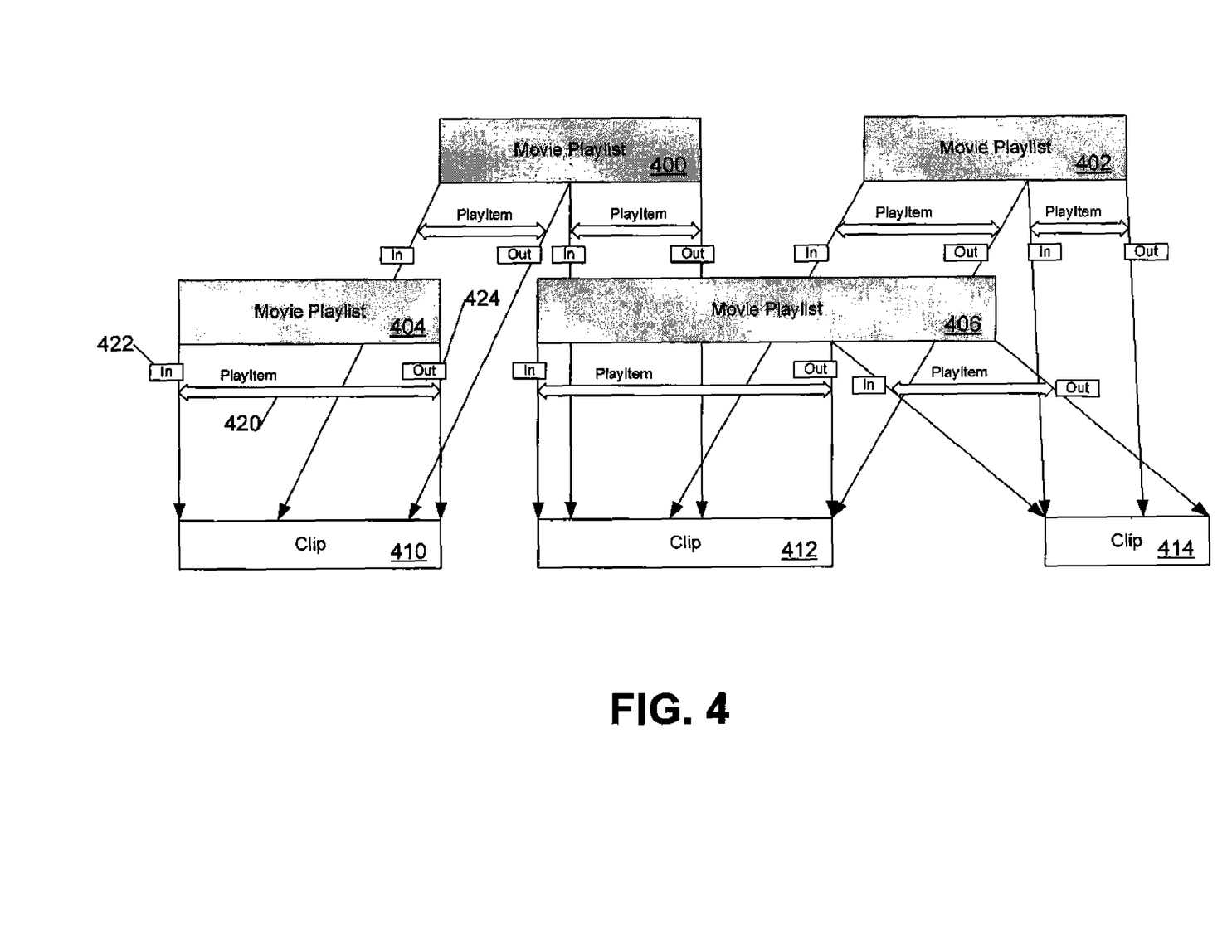
FIG. 4 shows one example of Playlists, which are a collection of playing intervals in the Clips that indicates which portion of the Clip to play and when to play the Clip.

FIG. 4 shows Playlist (i.e., "Movie Playlist") 400, 402, 404, 406, which is a collection of playing intervals in the Clips 410, 412, 414 that indicates which portion of the Clip to play and when to play the Clip. One such playing interval is called a PlayItem (e.g., 420) and includes an IN-point (e.g., 422) and an OUT-point (e.g., 424), each of which refers to positions on a time axis of the Clip. The IN-point indicates a start point of a playing interval, and the OUT-point indicates an end point of the playing interval.

Referring back to FIG. 1, an AV stream file together one object. In the context of the BD-ROM data structure, the AV stream file is referred to as a Clip AV stream file 144, and the associated database attribute file is referred to as a Clip Information file 142. An object including the Clip AV stream file 144 and its corresponding Clip information file 142 is referred to as a Clip 140.

The Clip Information file 142 stores the time stamps of the access point into the corresponding AV stream file 144. The BD player reads the Clip Information file 142 to find out the position where it should begin to read the data from the Clip AV stream file 144. Therefore, there is a one-to-one relationship between a Clip AV stream file 144 and a Clip Information file 142.

Contents are often combined using the concept of timelines, which is usually a continuous ruler that shows time code. The values of the time code (referred to as the "timecode") on the timeline are used to align data in time. However, the data that is being used in the authoring application is often sourced from media that has a discontinuity in the timecode. For example, a feature length movie that is 90 minutes long may be recorded onto two tapes because a tape has a certain defined length (e.g., 54 minutes). For this reason, the video recording person may record first 54 minutes of the movie in the first tape and then record next 36 minutes on the second tape. Further, if the second tape is start at an even hour timecode, there may be a break of 6 minutes in the timecode of the 90 minute movie. Users of authoring systems need to keep in mind this break in the timecode and need to work around it as the timeline in the authoring system is continuous and will not allow for the break.

The timecode is usually represented as hours, minutes, seconds, and frames. Hours run from 0 to 23; minutes run from 0 to 59; seconds run from 0 to 59; and frames run from 0 to the frame rate minus one. Thus, for a piece of content that has a frame rate of 60 frames per second, the frame value in the timecode runs from 0 to 59. For a piece of content that has a frame rate of 24 frames per second, the frame value in the timecode runs from 0 to 23. Other frame rates such as 23.976 fps are also used.

Figure 5A:
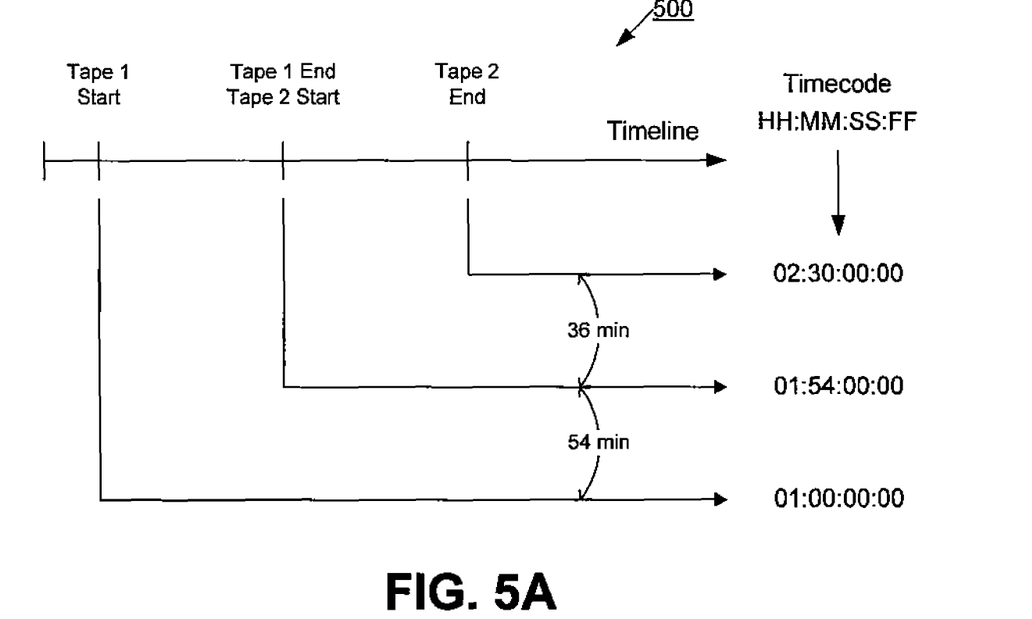
FIGS. 5A and 5B show two implementations of timecode on the timeline for recording an approximately 90 minute movie onto two tapes.

FIG. 5A shows one implementation 500 of timecode on the timeline for recording a 90-minute movie onto two tapes. The first tape starts at timecode 01:00:00:00 and ends at timecode 01:54:00:00, which is the timecode for the end of the first tape. Thus, the first tape spans 54 minutes. In the illustrated implementation 500 of FIG. 5A, the second tape starts at timecode 01:54:00:00 and ends at timecode 02:30:00:00 to span 36 minutes. For this implementation, the timecode is continuous because the start timecode for the second tape is exactly the same as the end timecode of the first tape. However, the video recording person sometimes starts the second tape at an even hour, which means the second tape would normally be started at timecode 02:00:00:00.

Figure 5B:
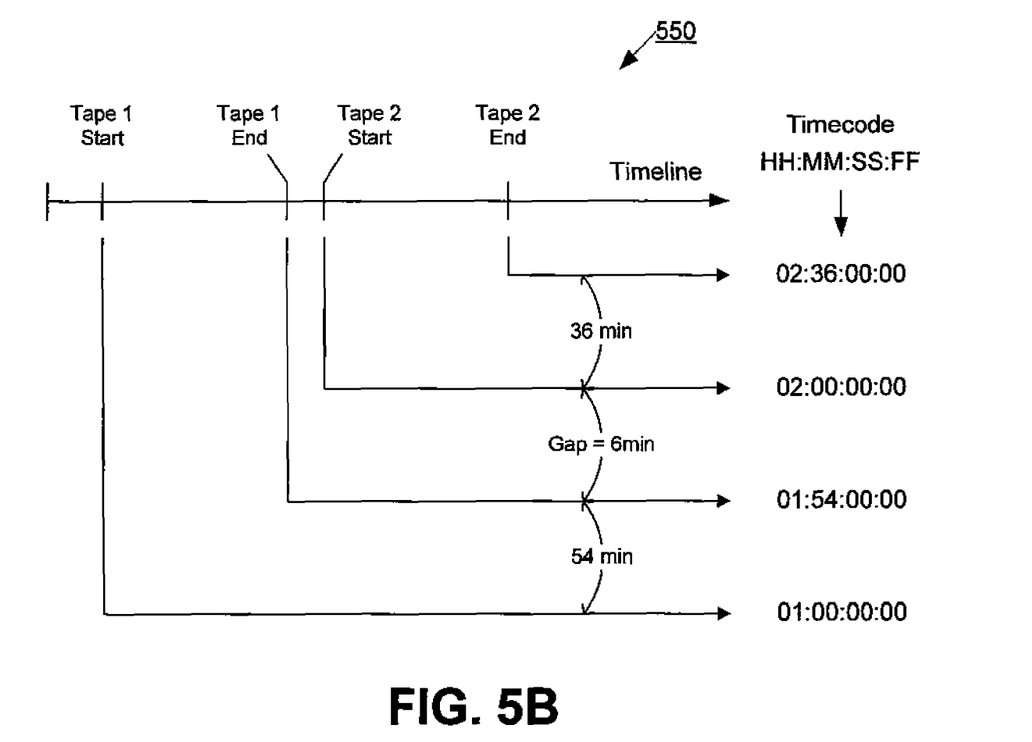

FIG. 5B shows another implementation 550 of timecode on the timeline for recording a 90-minute movie onto two tapes. However, in this implementation 550, the timecode is discontinuous. Again, the first tape starts at timecode 01:00:00:00 and ends at timecode 01:54:00:00, which is the timecode for the end of the first tape. However, in the illustrated implementation 550 of FIG. 5B, the second tape starts at timecode 02:00:00:00 (instead of timecode 01:54:00:00) and ends at timecode 02:36:00:00 to span 36 minutes. For this implementation, the timecode is discontinuous at 01:54:00:00 and has a gap of six minutes because the start timecode for the second tape starts six minutes after the end timecode of the first tape. However, it should be noted that the video content of the two tapes in the two cases illustrated in FIG. 5A and FIG. 5B are identical. That is, there are no frames of video lost or gained in either case. Only the timecodes are different.

Figure 6:
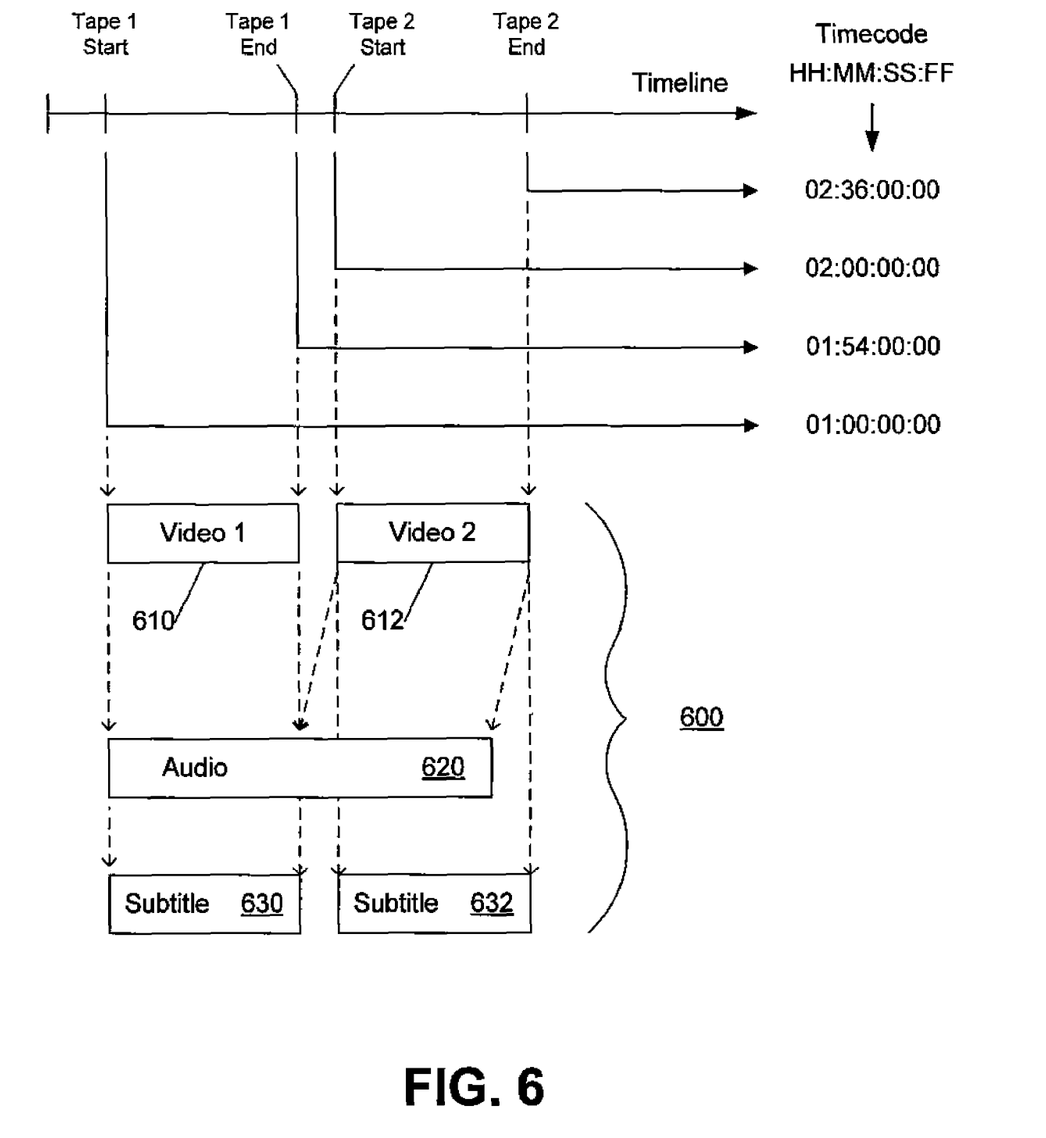
FIG. 6 illustrates the discontinuous timeline case in which video is recorded onto two tapes.

FIG. 6 illustrates the discontinuous timeline case in which video is recorded onto two tapes. In this implementation, input media streams 600 include two video files 610, 612 containing the video from the two tapes, an audio file 620, and two subtitle files 630, 632, corresponding to the two video files. The video files 610, 612 have a discontinuity in the timecode such that timecodes for the audio file 620 will need to be adjusted to synchronize with the discontinuous timeline of the video files 610, 612.

Although video and subtitle streams are shown as having one discontinuity in the timecode in this implementation, media streams can have more than one discontinuity in the timecode. For example, the subtitle file is usually prepared as a list of events in which the events are discontinuous. Thus, each event will include a start time and an end time. However, for simplicity in description, only one discontinuity in the video stream is illustrated and described. It is noted that subtitles are created in reference to the original video tapes. Thus, if the video is discontinuous, the subtitles are also always discontinuous. Typically, audio follows a different production path and it may or may not be discontinuous.

Figure 7A:
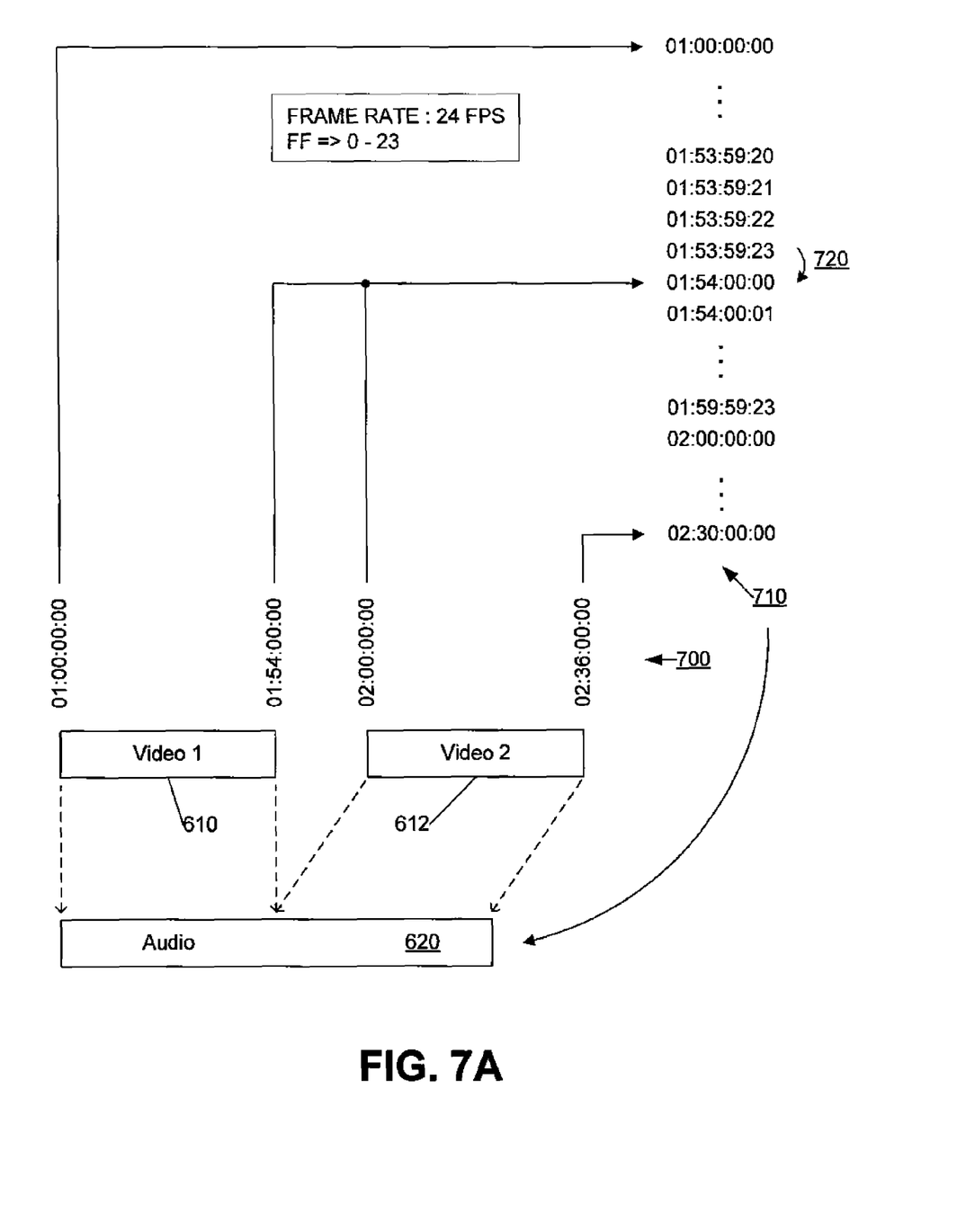
FIGS. 7A and 7B show two implementations of discontinuous timeline processing in which the timecode of the audio file will be synchronized to the timecode of the video files.
Figure 7B:
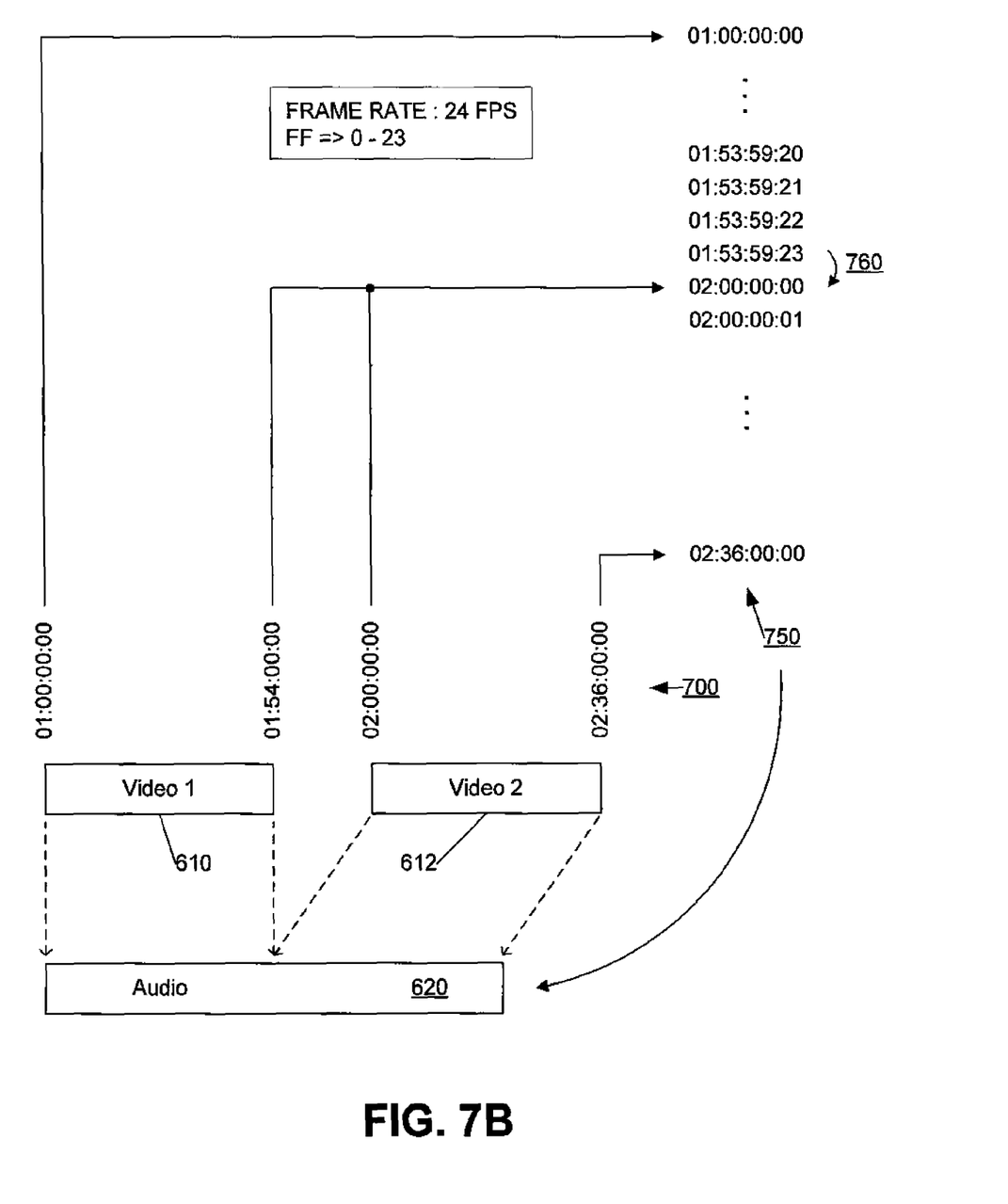

FIG. 7A and FIG. 7B show two implementations of discontinuous timeline processing in which the timecode of the audio file 620 will be synchronized to the timecode of the video files 610, 612. FIG. 7A shows one implementation of a discontinuous timeline processing in which discontinuous input timecodes are converted to continuous output timecodes for the purpose of synchronizing the audio to the video and presenting a seamless timeline. FIG. 7B shows another implementation of a discontinuous timeline processing in which discontinuous input timecodes are maintained to output discontinuous timecodes for the same purpose as FIG. 7A.

In the implementation of FIG. 7A, the video stream is assumed to have a frame rate of 24 frames per second, which means that the frame number (i.e., FF) of the timecode spans from 0 to 23. As discussed above, the input timecode 700 for the video files 610, 612 is discontinuous between 01:54:00:00 and 02:00:00:00. In this implementation, the discontinuous timeline processing records the output timecode 710 at the end of the first video file 610 as transitioning 720 from 01:53:59:23 to 01:54:00:00. It should be noted that an OUT time is exclusive and an IN time is inclusive. That is, although the end time of the first video file 610 is stated as being 01:54:00:00, the end time actually does not include the frame that is pointed to by that timecode. Thus, when the second video file 612 is re-timed to be continuous, it is started at 01:54:00:00 and this time the frame that is referred to by this timecode is inclusive and is the next frame in sequence after the end of the first video file 610.

The discontinuous timeline processing then records the output timecode 710 at the start of the second video file 612 as starting from 01:54:00:00 instead of 02:00:00:00. The output timecode 710 of the end of the second video file 612 is recorded as 02:30:00:00 instead of 02:36:00:00. Thus, in this implementation, the discontinuous timeline processing converts the discontinuous input timecode 700 to the continuous output timecode 710. This continuous output timecode 710 may then be stored as metadata and used for synchronizing the video stream with other media streams such as the audio stream.

As discussed above, the input timecode 700 for the video files 610, 612 is discontinuous between 01:54:00:00 and 02:00:00:00. In the implementation of FIG. 7B, the discontinuous timeline processing records the output timecode 750 at the end of the first video file 610 as transitioning from 01:53:59:23 to 02:00:00:00. Further, the discontinuous timeline processing records the output timecode 750 at the start of the second video file 612 as starting from 02:00:00:00. The output timecode 750 of the end of the second video file 612 is recorded as 02:36:00:00. Thus, in this implementation, the discontinuous timeline processing maintains the discontinuous input timecode 700 to the discontinuous output timecode 750 with discontinuity occurring at 01:53:59:23 with a jump 760 to 02:00:00:00. This discontinuous output timecode 750 may then be stored as metadata and used for synchronizing the video stream with other media streams such as the audio stream.

Figure 8:
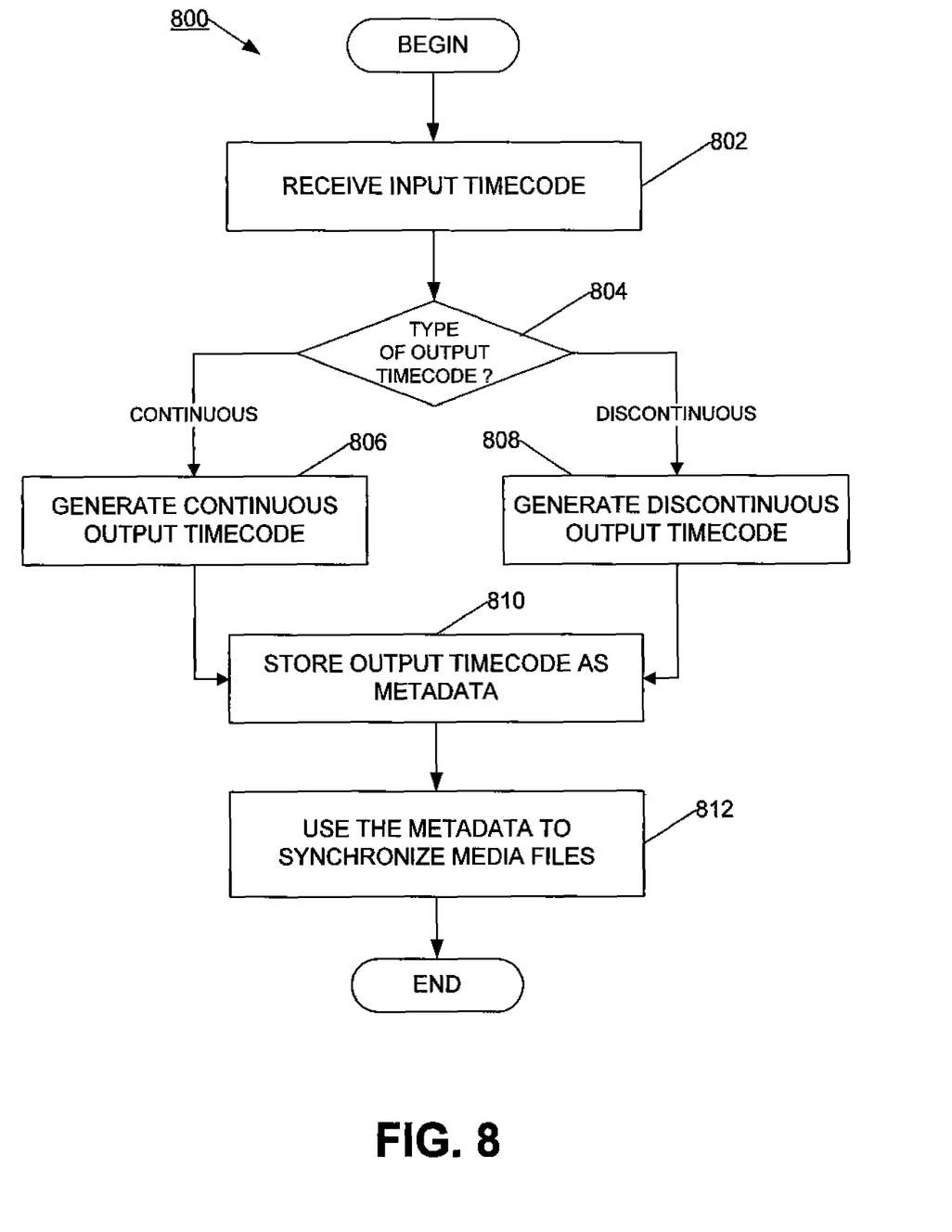
FIG. 8 is a flowchart illustrating a method of generating a synchronizing timecode for the BDAS.

FIG. 8 is a flowchart 800 illustrating a method of generating a synchronizing timecode for the BDAS. An input timecode is received, at 802. As discussed above, the input timecode is usually in the form of a discontinuous timecode associated with video files such that other media files can be synchronized to the output timecode generated for the video files. However, the timecode associated with other media files such as a subtitle file can be used to generate an output timecode such that video and audio files are synchronized to that output timecode. At 804, a user specifies the type of the output timecode to be either continuous or discontinuous.

If the user specifies a continuous timecode, a continuous output timecode is generated, at 806, according to the process illustrated in FIG. 7A. This process can be generally described as follows: (1) generating an output timecode that matches the discontinuous input timecode until the start point of the discontinuity, and continue generating the output timecode sequentially from a timecode subsequent to the end point of the discontinuity. This effectively eliminates the discontinuity while recording the offset so it may be applied to other types of files such as audio and subtitles to achieve synchronization.

If the user specifies a discontinuous timecode, a discontinuous output timecode is generated, at 808, according to the process illustrated in FIG. 7B. This process can be generally described as follows: (1) generating an output timecode that matches the discontinuous input timecode until the start point of the discontinuity, and continue generating the output timecode that matches input timecode from a timecode subsequent to the end point of the discontinuity. The generated output timecode is stored as metadata, at 810, which is used to synchronize the media files.

Figure 9:
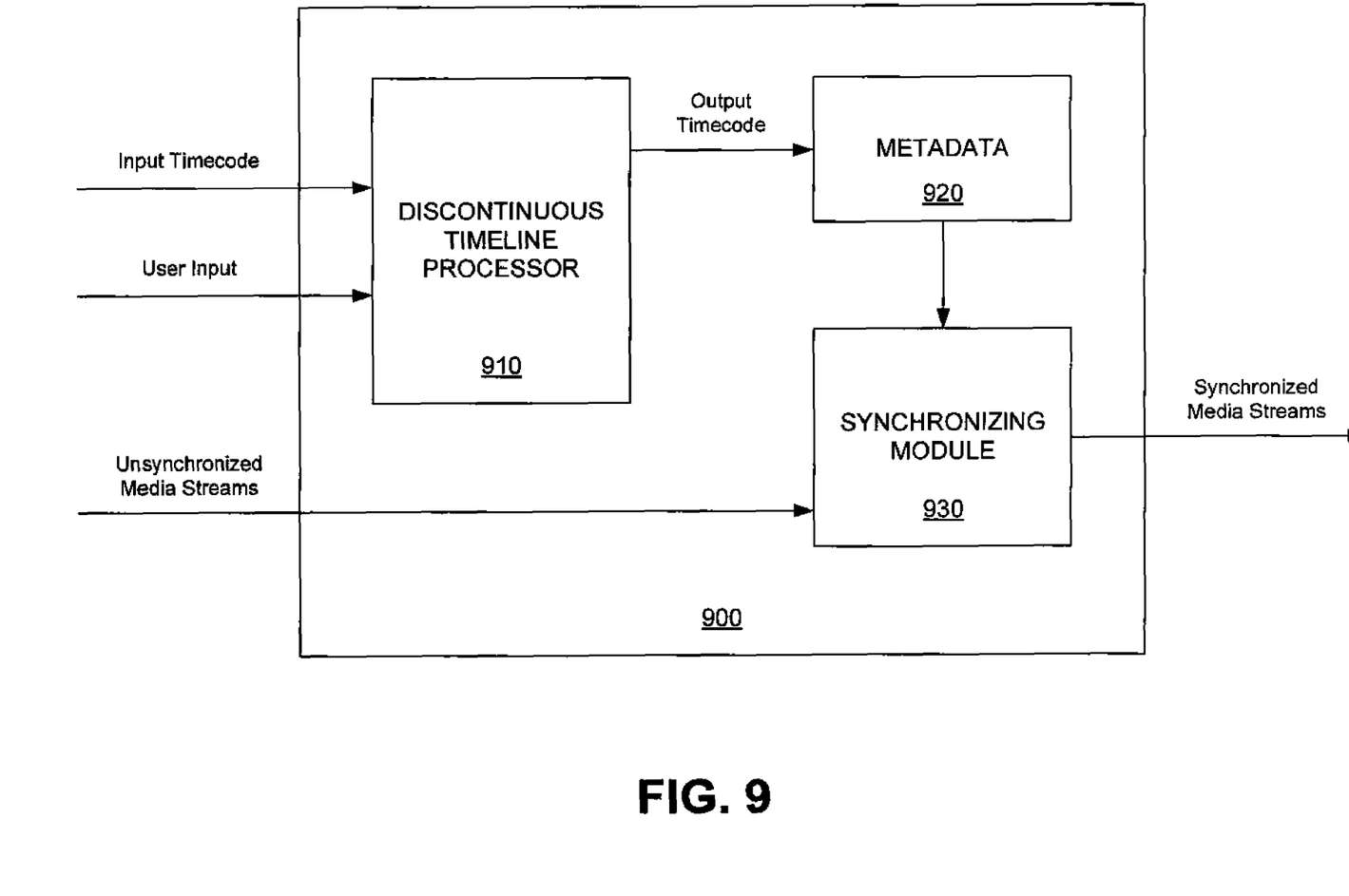
FIG. 9 is a block diagram of a timecode synchronizing module for the BDAS.

FIG. 9 is a block diagram of a timecode synchronizing module 900 for the BDAS. In the illustrated implementation of FIG. 9, the timecode synchronizing module 900 includes a discontinuous timeline processor 910, metadata 920, and a synchronizing module 930. The discontinuous timeline processor 910 receives the input timecode, which is usually in the form of a discontinuous timecode associated with video files. The discontinuous timeline processor 910 also receives a user input that specifies the type of the output timecode to be either continuous or discontinuous. If the user specifies a continuous timecode, a continuous output timecode is generated according to the process illustrated in FIG. 7A. If the user specifies a discontinuous timecode, a discontinuous output timecode is generated according to the process illustrated in FIG. 7B. The generated output timecode is stored as metadata 920. The synchronizing module 930 receives the metadata 920 and unsynchronized media streams, and synchronizes the media streams using the metadata (including the synchronizing output timecode).

Figure 10A:
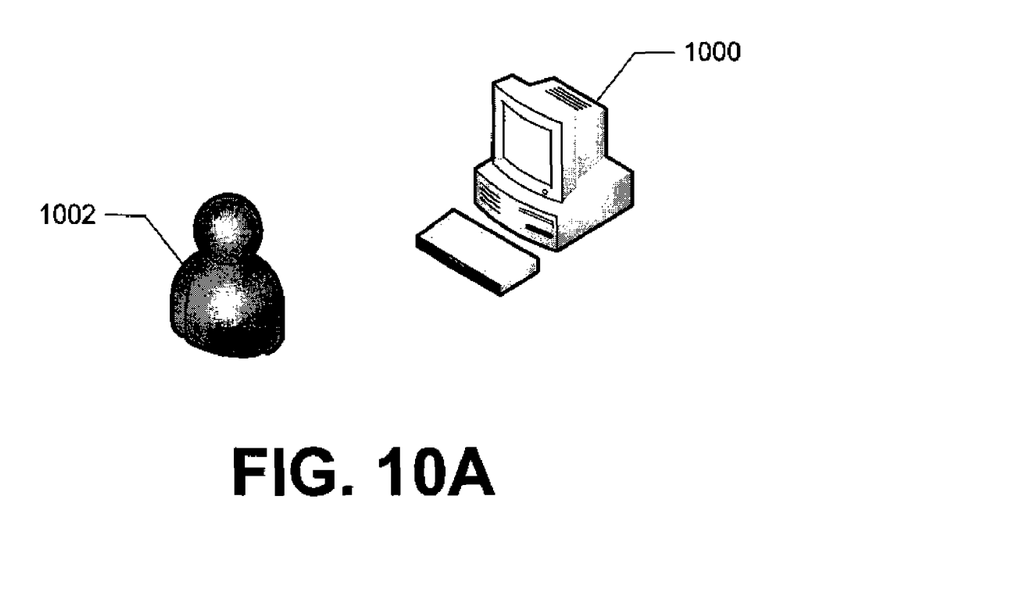
FIG. 10A shows a representation of a computer system and a user.

FIG. 10A shows a representation of a computer system 1000 and a user 1002. The user 1002 can use the computer system 1000 to author a Blu-ray disc (BD). In one implementation, the computer system 1000 executes a timecode synchronizing module for the BDAS 1012, which receives unsynchronized media streams and outputs synchronized media streams for authoring a BD.

Figure 10B:
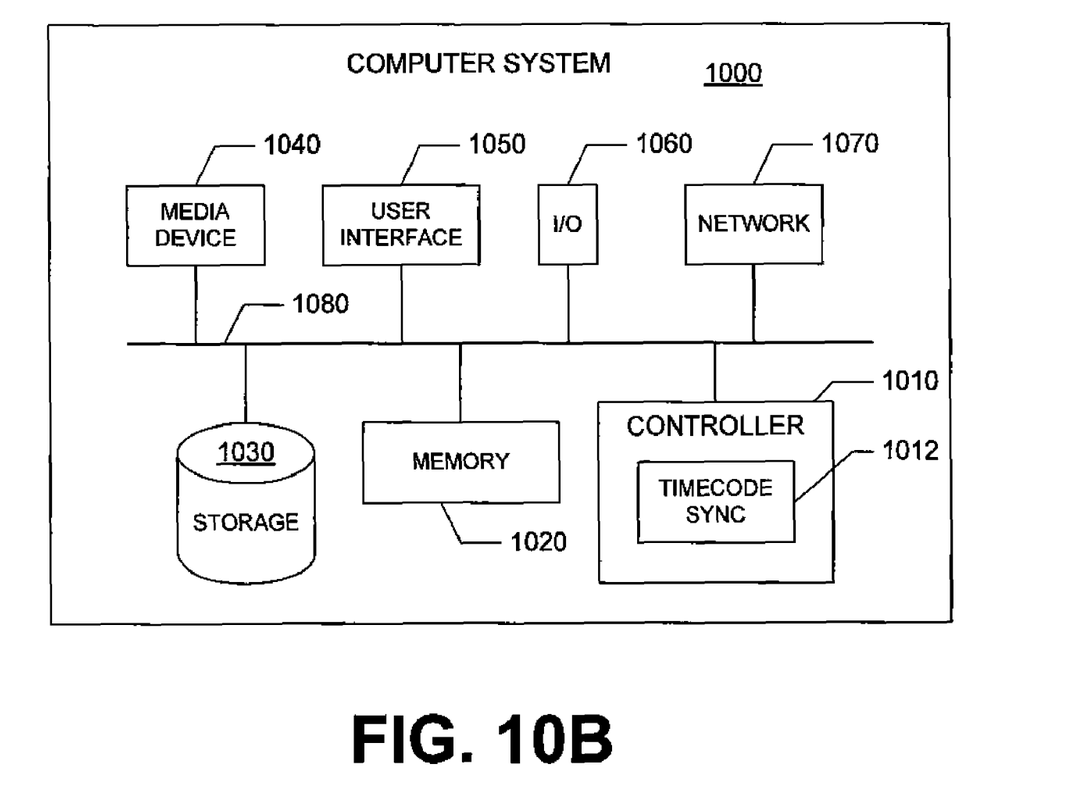
FIG. 10B shows a block diagram of one implementation of the computer system in FIG. 10A, including a timecode synchronizing module for the BDAS.

FIG. 10B shows a block diagram of one implementation of the computer system 1000 in FIG. 10A, including the timecode synchronizing module for the BDAS 1012. The computer system 1000 includes a controller 1010, a memory 1020, storage 1030, a media device 1040, a user interface 1050, an input/output (I/O) interface 1060, and a network interface 1070. These components are interconnected by a common bus 1080. Alternatively, different connection configurations can be used, such as a star pattern with the controller at the center.

The controller 1010 is a programmable processor and controls the operation of the computer system 1000 and its components. The controller 1010 loads instructions from the memory 1020 or an embedded controller memory (not shown) and executes these instructions to control the system. In its execution, the controller 1010 provides the timecode synchronizing module for the BDAS 1012 as a software system. Alternatively, this service can be implemented as separate components in the controller 1010 or the computer system 1000.

Memory 1020 stores data temporarily for use by the other components of the computer system 1000. In one implementation, memory 1020 is implemented as RAM. In one implementation, memory 1020 also includes long-term or permanent memory, such as flash memory and/or ROM.

Storage 1030 stores data temporarily or long term for use by other components of the computer system 1000, such as for storing BD data used by the timecode synchronizing module for the BDAS 1012. In one implementation, storage 1030 is a hard disk drive.

The media device 1040 receives removable media and reads and/or writes data to the inserted media. In one implementation, the media device 1040 is an optical disc drive.

The user interface 1050 includes components for accepting user input from the user of the computer system 1000 and presenting information to the user. In one implementation, the user interface 1050 includes a keyboard, a mouse, audio speakers, and a display. The controller 1010 uses input from the user to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (802.11) supporting an Ethernet connection.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

Various illustrative implementations of the present invention have been described. However, one of ordinary skill in the art will recognize that additional implementations are also possible and within the scope of the present invention. For example, although timecode synchronization has been described exclusively in terms of the PD format, the system can be used to author discs in formats other than the BD format, such as the DVD format and the HD-DVD format. Further, although the discontinuous input timecode has been described in terms of having one gap, the input timecode can have more than one gap and the discontinuous timeline processor is able to process the multiple gaps. Further, although the discontinuous input timecode has been described in terms of having a gap, the input timecode can have overlaps in which a portion of the input timecode repeats and the discontinuous timeline processor is able to process the overlap.

Accordingly, the present invention is not limited to only those implementations described above.

What is claimed is:

1. A method of synchronizing media data used in authoring a Blu-ray disc (BD), the method comprising:
    receiving BD media data having at least an audio portion and a video portion, the audio portion formed from at least one audio stream and the video portion formed from a plurality of video streams,
    wherein a discontinuous input timecode having at least one discontinuity is associated with said plurality of video streams,
    wherein said at least one discontinuity has a start point and an end point, and is present between video streams;
    first generating an output timecode for the video portion that matches said discontinuous input timecode until the start point of said at least one discontinuity, and continue first generating said output timecode sequentially from a timecode subsequent to the end point of said at least one discontinuity, when a user specifies converting the discontinuous input timecode to a continuous output timecode; and
    second generating an output timecode for the video portion that matches said discontinuous input timecode until the start point of said at least one discontinuity, and continue second generating said output timecode that matches input timecode from a timecode subsequent to the end point of said at least one discontinuity, when the user specifics maintaining the discontinuous input timecode as a discontinuous output timecode.

2. The method of claim 1, further comprising
    using the generated output timecode for the video portion to synchronize with a timecode for the audio portion.

3. The method of claim 1, wherein the BD media data further includes a plurality of subtitle streams.

4. The method of claim 3, wherein another discontinuous input timecode is associated with said plurality of subtitle streams.

5. The method of claim 1, wherein said at least one audio stream of the media data includes at least one audio file, and said plurality of video streams includes a plurality of video files.

6. The method of claim 5, wherein said at least one discontinuity includes at least one gap in said discontinuous input timecode associated with the plurality of video files.

7. The method of claim 1, wherein said at least one discontinuity includes
    at least one overlap in said discontinuous input timecode associated with the multiple video files.

8. The method of claim 1, wherein said first generating an output timecode and said continue first generating includes:
    first recording said output timecode for the video portion that matches said input timecode up to the start point of said at least one discontinuity; and
    second recording said output timecode for the video portion that offsets from said input timecode by the time amount of said at least one discontinuity after the end point of said at least one discontinuity,
    wherein said first recording and said second recording converts said discontinuous input timecode to the continuous output timecode.

9. The method of claim 1, wherein said second generating an output timecode and said continue second generating includes:
    first recording said output timecode for the video portion that matches said input timecode up to the start point of said at least one discontinuity; and
    second recording said output timecode for the video portion that matches said input timecode after the end point of said at least one discontinuity,
    wherein said first recording and said second recording maintains said discontinuous input timecode as the discontinuous output timecode.

10. A system of synchronizing media data used in authoring a Blu-ray disc (BD), the system comprising:

a receiver configured to receive BD media data having at least an audio portion and a video portion, the audio portion formed from at least one audio stream and the video portion formed from a plurality of video streams, wherein a discontinuous input timecode having at least one discontinuity is associated with said plurality of video streams.

wherein said at least one discontinuity has a start point and an end point, and is present between video streams; and a discontinuous timeline processor configured to:
(1) generate an output timecode for the video portion that matches said discontinuous input timecode until the start point of said at least one discontinuity, and continue to generate said output timecode sequentially from a timecode subsequent to the end point of said at least one discontinuity, when a user specifies converting the discontinuous input timecode to a continuous output timecode; and
(2) generate an output timecode for the video portion that matches said discontinuous input timecode until the start point of said at least one discontinuity, and continue second generating said output timecode that matches input timecode from a timecode subsequent to the end point of said at least one discontinuity, when the user specifies maintaining the discontinuous input timecode as a discontinuous output timecode.

11. The system of claim 10, wherein the discontinuous timeline processor comprises
a synchronizer configured to synchronize the output timecode for the video portion with a timecode for the audio portion.

12. The system of claim 10, wherein the BD media data further includes a plurality of subtitle streams.

13. The system of claim 12, wherein another discontinuous input timecode is associated with said plurality of subtitle streams.

14. The system of claim 10, wherein said at least one audio stream of the media data includes at least one audio file, and said plurality of video streams includes a plurality of video files.

15. The system of claim 14, wherein said at least one discontinuity includes at least one gap in said discontinuous input timecode associated with the plurality of video files.

16. The system of claim 10, wherein said at least one discontinuity includes
at least one overlap in said discontinuous input timecode associated with the multiple video files.

17. An apparatus for synchronizing media data used in authoring a Blu-ray disc (BD), the apparatus comprising:
means for receiving BD media data having at least an audio portion and a video portion, the audio portion formed from at least one audio stream and the video portion formed from a plurality of video streams,
wherein a discontinuous input timecode having at least one discontinuity is associated with said plurality of video streams,
wherein said at least one discontinuity has a start point and an end point, and is present between video streams;
means for generating an output timecode for the video portion that matches said discontinuous input timecode until the start point of said at least one discontinuity, and continue generating said output timecode sequentially from a timecode subsequent to the end point of said at least one discontinuity, when a user specifies converting the discontinuous input timecode to a continuous output timecode; and
means for generating an output timecode for the video portion that matches said discontinuous input timecode until the start point of said at least one discontinuity, and continue generating said output timecode that matches input timecode from a timecode subsequent to the end point of said at least one discontinuity, when the user specifies maintaining the discontinuous input timecode as a discontinuous output timecode.

18. A non-transitory storage medium; storing a computer program for synchronizing media data used in authoring a Blu-ray disc (BD), the computer program comprising executable instructions that cause a computer to:
receive BD media data having at least an audio portion and a video portion, the audio portion formed from at least one audio stream and the video portion formed from a plurality of video streams;
wherein a discontinuous input timecode having at, least one discontinuity is associated with said plurality of video streams,
wherein said at least one discontinuity has a start point and an end point, and is present between video streams;
generate an output timecode for the video portion that matches said discontinuous input timecode until the start point of said at least one discontinuity, and continue to generate said output timecode sequentially from a timecode subsequent to the end point of said at least one discontinuity, when a user specifies converting the discontinuous input timecode to a continuous output timecode; and
generate an output timecode for the video portion that matches said discontinuous input timecode until the start point of said at least one discontinuity, and continue to generate said output timecode that matches input timecode from a timecode subsequent to the end point of said at least one discontinuity, when the user specifies maintaining the discontinuous input timecode as a discontinuous output timecode.

* * * * *